Jan. 19, 1932.  J. DE KONING ET AL  1,841,939
BAND SAW STRUCTURE
Filed Feb. 16, 1931     3 Sheets-Sheet 2
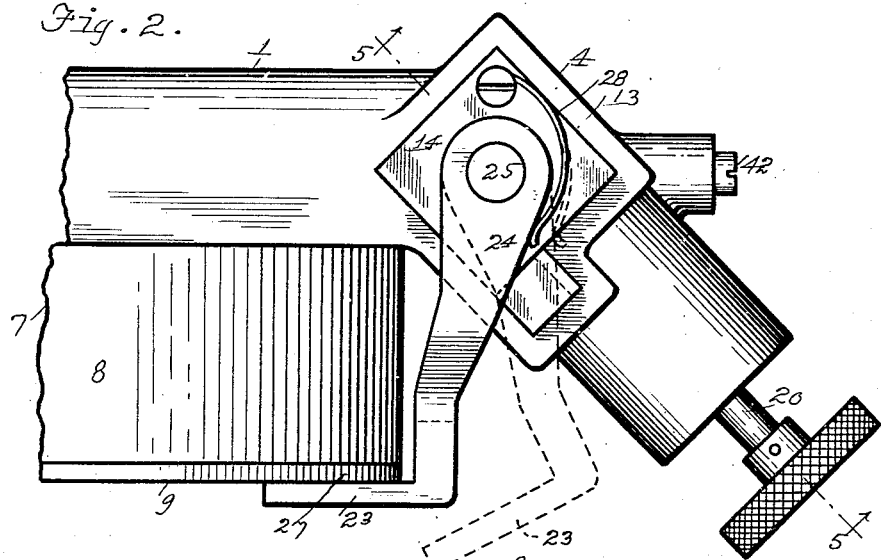
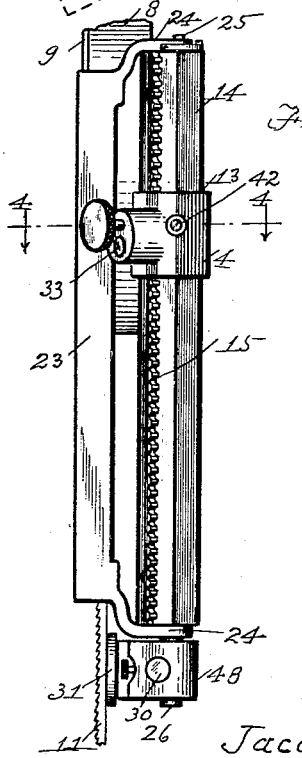
Inventors
Jacob De Koning
Charles H. Antrim
By Rice and Rice
Attorneys
Witness:

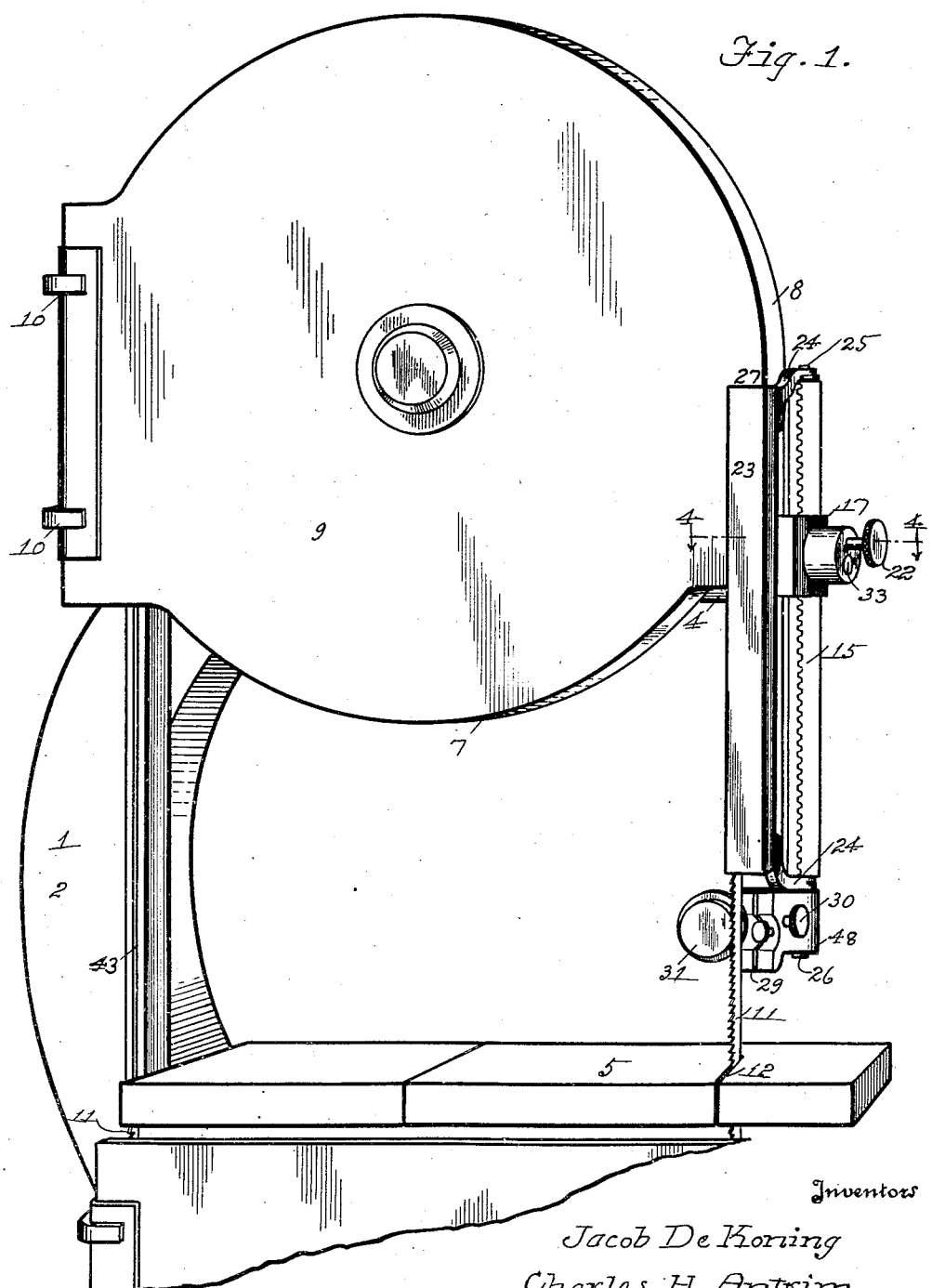

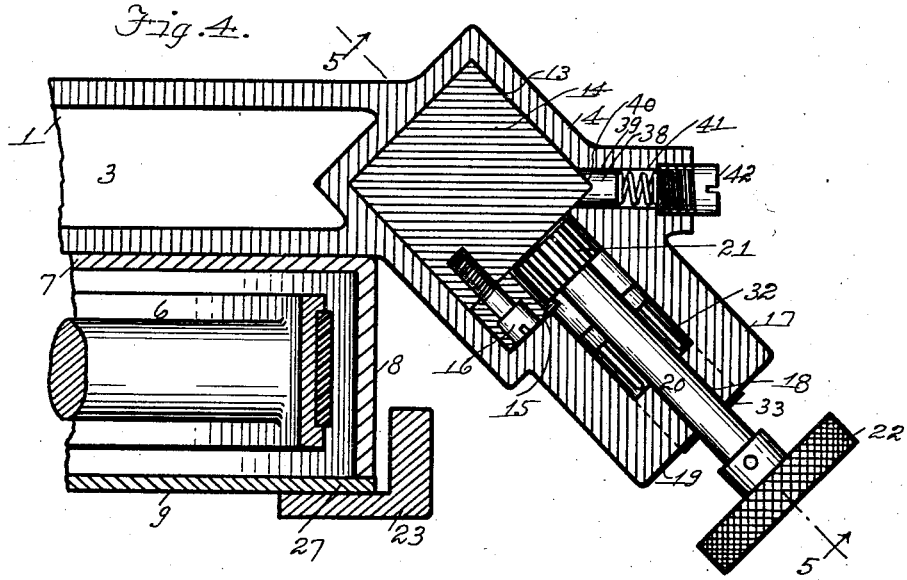
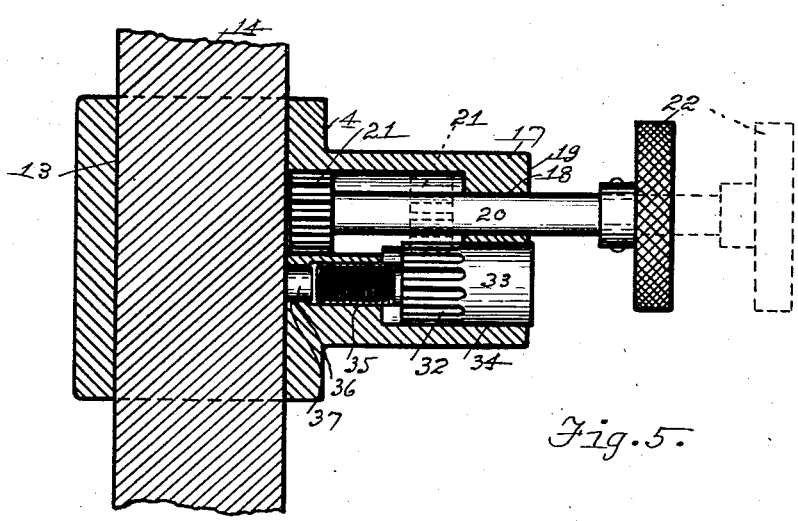

Patented Jan. 19, 1932

1,841,939

UNITED STATES PATENT OFFICE

JACOB DE KONING AND CHARLES H. ANTRIM, OF GRAND RAPIDS, MICHIGAN, ASSIGNORS TO GALLMEYER AND LIVINGSTON COMPANY, OF GRAND RAPIDS, MICHIGAN, A CORPORATION OF MICHIGAN

BAND SAW STRUCTURE

Application filed February 16, 1931. Serial No. 515,923.

The present invention relates to band saws; and an object thereof is to provide improved means for raising and lowering a guide for such a saw, so that work of varying thicknesses may be operated on; a further object is to provide an improved casing for one of the saw-carrying wheels having an openable closure; a further object is to provide an improved guard for the tangential portion of the saw with improved means for raising and lowering the same; and a further object is to provide in combination such a guide and guard with raising and lowering means, and means for holding such closure shut.

These and any other and more specific objects, and objects relating to construction and combination of parts, hereinafter appearing are attained by, and the invention finds preferable embodiment in, the structure and mechanism described in the body of this specification and illustrated by the accompanying drawings, in which:—

Figure 1 is an elevational view in perspective of a band saw structure;

Figure 2 is a top plan view of a portion thereof;

Figure 3 is a front elevational view of parts thereof;

Figure 4 is a horizontal sectional view of parts of the structure taken on line 4—4 of Figures 1 and 3; and Figure 5 is a vertical sectional view of certain parts taken on line 5—5 of Figures 2 and 4.

In these drawings is illustrated a band saw structure comprising an arm indicated generally 1 having an upright main portion 2, an approximately horizontal portion 3 (extending toward the right hand side of Figure 1) and a downwardly extending free end portion 4, the structure comprising also the flat horizontal table or work-support 5.

On said arm (i. e. on its portion 3) is journalled the saw-carrying upper wheel 6 housed in an approximately circular guard or casing 7 mounted on said portion 3 and having a rim portion 8 and a closure 9 hingedly mounted as indicated at 10 and openable by forwardly swinging movement from its closed position shown in Figures 1, 2 and 4.

The band saw 11 is carried by this upper wheel 6 and by a lower wheel (not shown) under the table 5, the saw extending through a slit 12 in the table and passing upwardly in a guide groove 43.

The downwardly extending free end portion 4 of the arm 1 has a vertical bearing 13 in which slidably bears member 14, desirably rectangular in cross section as particularly shown in Figures 2 and 4, having a parallel toothed rack 15 which in the illustrated construction is of separate piece from and secured to said member 14 by screws 16. Said downwardly extending free end portion 4 has a boss 17 desirably extending inclinedly forwardly-laterally as particularly shown in Figures 2 and 4 to a position convenient for the manual operation of the hereinafter described parts mounted therein. This boss 17 is hollow as seen in Figures 4 and 5 and has a bearing 18 through one of its walls 19 in which bearing a shaft 20 is rotatable and axially movable. The inner end of this shaft has a gear 21 meshing with the rack 15 in the position shown in Figure 4 for raising or lowering the member 14 by manually turning the shaft's knob handle 22.

Latching means for holding the cover 9 shut comprises the vertically extending body portion 23 and upper and lower arms 24 pivotally mounted on the upwardly and downwardly extending pins 25, 26 of said member 14 so as to be swung horizontally to the position shown in Figures 1, 4 and in solid lines in Figure 2 wherein said body portion 23 overlies the free edge portion 27 of the cover 9 (oppositely to its hinge mounting 10) to hold said cover shut, or said latching means may be swung against the pressure of a spring 28 to the opposite position indicated in dotted lines in Figure 2, wherein it releases said cover which may now be swung to open position, exposing the upper wheel 6 and the saw itself in the casing 7.

It will be seen that the body portion 23 of the latching means is of sufficient vertical extent to engage or overlie the free edge portion of the cover 9 and hold the cover shut, in the various positions to which the member 14 carrying the latching means may be raised or lowered.

A foot 48 is carried at the lower end of said member 14, embracing its lower pin 26 and being split at 29 to be clamped thereon by the set screw 30, this foot having rotatably mounted thereon the guide roll 31 for the saw.

When the member 14 and its foot 48 are moved, by turning the shaft 20 in mesh with the rack 15, to proper vertical position to accomodate the thickness of the work piece on the table 5, said member and foot may be secured in that position by axially moving said shaft 20 outwardly (by its handle 22), to a position indicated in dotted lines in Figure 5, wherein its gear 21 is withdrawn from meshing with rack 15 and moved into mesh with the toothed end or head 32 of a screw clamp member 33 rotatable in a bearing 34 in the boss 17 and having a screw shank threaded at 35 in said boss, so that the rotation of this screw clamp member 33, when turned by the shaft 20 in one direction, will cause its inner end to abut on the side of the member 14 (or to abut, as shown, on the block 36 slidable in a bearing 37 in the boss to cause this block to abut on said member) and thus clamp said member 14 in the position in which it has been adjusted, the reverse movement of shaft 20 and screw clamp member 33 releasing member 14 from such held position. A friction element 38 slidable horizontally in a bearing 39 in said boss and having an inner end 40 with oppositely inclined sides adapted to contact the corresponding sides of member 14 adjacent a corner thereof, is moved inwardly (and yieldingly through the coiled spring 41) by turning the screw plug 42 to cause sufficient clamping or braking frictional engagement with said member to hold the same in an elevated position.

It will be seen that the cover 9 constitutes a guard for that portion of the saw which contacts the wheel 6 (and for the wheel itself) within the casing, and that the body portion 23 of the latching means constitutes a guard for the portion of the saw which is tangential to said wheel.

It will also be seen that the roll 31 mounted on the lower portion of the vertically movable member 14 forms a guide for the saw which may be raised and lowered with said member to accommodate work of different thicknesses.

The invention being intended to be pointed out in the claims, is not to be limited to or by details of construction of the particular embodiment thereof illustrated by the drawings or hereinbefore described.

What is claimed is:

1. In a band saw structure: a saw-carrying wheel; a guard for the portion of the saw contacting the wheel, mounted for movement to operative position: a guard for the portion of the saw tangential to the wheel, mounted for movement parallel with said tangential portion and for movement to a position operatively covering the same and holding the first-mentioned guard in operative position.

2. In a band saw structure: a frame having a slide bearing extending parallelly with the tangential portion of the saw; a saw-carrying wheel; a guard for the portion of the saw contacting the wheel, mounted for swinging movement to operative position; a member slidable in the slide bearing; a guard for said tangential portion mounted on said member for swinging movement to operative position covering said tangential portion and to holding engagement with the first-mentioned guard in its operative position.

3. In a band saw structure: a frame having a slide bearing extending parallelly with the tangential portion of the saw; a saw-carrying wheel; a guard for the portion of the saw contacting the wheel, mounted for swinging movement to operative position covering said portion; a member slidable in the slide bearing and having a toothed rack; a guard for the portion of the saw tangential to the wheel, mounted on said member for swinging movement to operative position covering said tangential portion and to holding engagement with the first-mentioned guard in its operative position; a rotatable gear meshing with said rack for moving said member in the slide bearing.

4. In a band saw structure: a frame having a slide bearing extending parallelly with the tangential portion of the saw; a saw-carrying wheel; a guard for the portion of the saw contacting the wheel, mounted for swinging movement to operative position covering said portion; a member slidable in the slide bearing and having a toothed rack; a guard for the portion of the saw tangential to the wheel, mounted on said member for swinging movement to operative position covering said tangential portion and to holding engagement with the first-mentioned guard in its operative position; a rotatably and axially movable shaft having a gear meshing in one axial position of the shaft with the rack for moving said member in the slide bearing; a screw clamp turnable to a position operatively engaging said member, and having a toothed portion meshing with the gear in another axial position of the shaft when said gear is withdrawn from mesh with the rack.

5. In a band saw structure: a frame having a saw-carrying wheel and a slide-bearing extending parallelly with the portion of the saw tangential to the wheel; a member slidable in said bearing and having a toothed rack; a guard for the saw carried by said member; a rotatably and axially movable shaft having a gear meshing in one axial position of the shaft with the rack for moving said member in the slide bearing; a screw clamp turnable to a position operatively engaging said member, and having a toothed portion meshing with the gear in another axial position of the shaft when said gear is withdrawn from mesh with the rack.

6. In a band saw structure: a frame having a work-supporting table, a saw-carrying wheel and a bearing extending parallelly with the tangential portion of the saw; a guard for the portion of the saw contacting the wheel, mounted for swinging movement to operative position covering said wheel-contacting portion; a member movable in said bearing and having a guide for said tangential portion above the work on the table; a guard for said tangential portion mounted on said member for swinging movement to operative position covering said tangental portion and to holding engagement with the first-mentioned guard in its operative position; means for holding said member in adjusted position in said bearing.

7. In a band saw structure: a frame having a work-supporting table, a saw-carrying wheel and a bearing extending parallelly with the tangential portion of the saw; a guard for the portion of the saw contacting the wheel, mounted for swinging movement to operative position covering said wheel-contacting portion; a member movable in said bearing and having a guide for said tangential portion above the work on the table; a guard for said tangential portion mounted on said member for swinging movement to operative position covering said tangential portion and to holding engagement with the first-mentioned guard in its operative position; a toothed rack carried by said member and a gear meshing therewith journalled on the frame adjacent said bearing for moving said member therein.

8. In a band saw structure: a frame having a work-supporting table, a saw-carrying wheel and a bearing extending parallelly with the tangential portion of the saw; a guard for the portion of the saw contacting the wheel, mounted for swinging movement to operative position covering said wheel-contacting portion; a member movable in said bearing and having a guide for said tangential portion above the work on the table and having also a toothed rack; a guard for said tangential portion mounted on said member for swinging movement to operative position covering said tangential portion and to holding engagement with the first-mentioned guard in its operative position; a rotatably and axially movable shaft having a gear meshing in one axial position of the shaft with the rack for moving said member in said bearing; a screw clamp turnable to a position clamping said member, and having a toothed portion meshing with the gear in another axial position of the shaft when said gear is withdrawn from mesh with the rack.

9. In a band saw structure: a frame comprising a work-supporting table and a standard extending above the same having a depending portion spaced above the table; a saw-carrying wheel journalled on the standard; a guard for the portion of the saw contacting the wheel, mounted on the standard for movement to operative position; a guard for the portion of the saw tangential to the wheel, mounted on said depending portion of the standard, for movement to a position holding the first-mentioned guard in operative position.

10. In a band saw structure: a frame comprising a work-supporting table and a standard extending above the same having a depending portion spaced above the table; a saw-carrying wheel journalled on the standard; a guard for the portion of the saw contacting the wheel, mounted on the standard for movement to operative position; a guard for the portion of the saw tangential to the wheel, mounted on said depending portion of the standard, for movement to a position operatively covering said tangential portion and holding the first-mentioned guard in operative position.

In testimony whereof we have hereunto set our hands at Grand Rapids, Michigan, this 13th day of February, 1931.

JACOB De KONING.
CHARLES H. ANTRIM.